No. 760,961. PATENTED MAY 24, 1904.
H. W. COON.
SCREEN FOR POTATO DIGGERS.
APPLICATION FILED NOV. 14, 1901.
NO MODEL.

Witnesses
Edwin G. McKee
John H. Byrne

Inventor
Horace W. Coon
By Victor J. Evans
Attorney

No. 760,961. Patented May 24, 1904.

UNITED STATES PATENT OFFICE.

HORACE W. COON, OF OTTERCREEK, WISCONSIN.

SCREEN FOR POTATO-DIGGERS.

SPECIFICATION forming part of Letters Patent No. 760,961, dated May 24, 1904.

Application filed November 14, 1901. Serial No. 82,300. (No model.)

*To all whom it may concern:*

Be it known that I, HORACE W. COON, a citizen of the United States, residing at and whose post-office address is Ottercreek, in the county of Eau Claire and State of Wisconsin, have invented new and useful Improvements in Potato-Diggers, of which the following is a specification.

My invention relates to screens for potato-diggers, and has for its primary object the production of new and useful means for adjustably mounting the screen whereby it may be adjusted to any inclination to operate with different effect upon potatoes taken from moist or dry soil.

A further object of the invention is to provide simple and cheap yet durable and efficient devices of the above-stated character which will be composed of few parts and those so arranged as not to be liable to become inoperative.

With the above and other objects in view the invention consists of the construction, combination, and arrangement of parts hereinafter fully described, claimed, and illustrated in the accompanying drawings, which disclose the preferred form of my invention, and in which—

Figure 1:
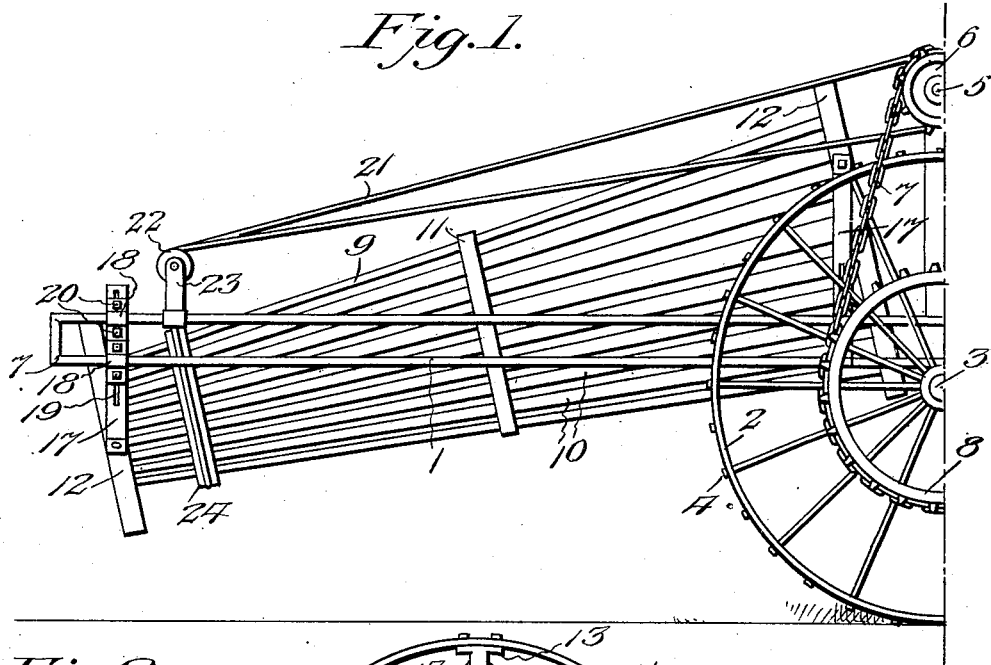
Figure 2:
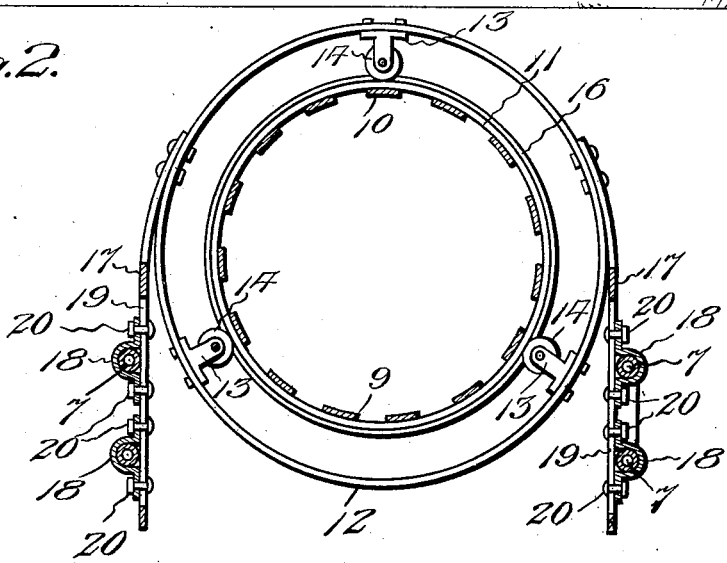
Figure 3:
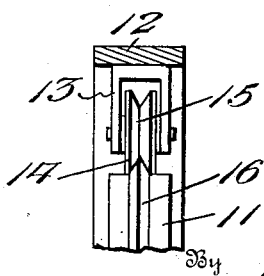

Figure 1 is a side elevation of the rear portion of a potato-digger, illustrating my invention in applied position. Fig. 2 is a cross-section through the rotary screen adjacent to one of the screen-supporting frames. Fig. 3 is an enlarged section through one of the supporting-frames and hoops adjacent to one of the bearing-rollers.

Similar numerals of reference denote like parts in all figures of the drawings.

1 designates the rear portion of the main frame of a potato-digger, the same being preferably constructed of parallel bars suitably connected and braced. This portion of the frame is supported by drive-wheels 2, keyed to a shaft 3, which is suitably journaled upon the frame. The rims of the wheels 2 are provided with transversely-disposed ribs 4 for obtaining the necessary hold upon the ground.

A shaft 5 is revolubly supported above the wheels 2 and is provided at one or both ends with sprocket-wheels 6, actuated by a drive-chain 7, which extends downwardly and passes around a sprocket-wheel 8, mounted upon the shaft 3, whereby when the machine is propelled the shaft 5 is caused to revolve.

9 designates a rotary screen which receives the potatoes as they are delivered from and by a primary elevator situated in front of the machine and adapted to receive the potatoes from a digging mechanism. This screen is in the form of a slatted frustum comprising longitudinally-extending slats 10 and a plurality of bands or hoops 11, by which the slats are connected and braced. The screen is inclined downwardly toward its rear end, so as to cause the potatoes to traverse the entire length of the screen during the rolling operation thereof. In such movement of the potatoes they are subjected to a thorough agitation, and the earth is effectively loosened therefrom and escapes between the slats 10.

The rotary screen 9 is rotatably mounted at its opposite ends within a pair of supporting-frames 12, one of which is illustrated in detail in Figs. 2 and 3, each of such frames being in the form of an annulus and provided upon its inner surface with brackets 13, in which are journaled bearing-rollers 14, peripherally grooved, as at 15, to receive and guide the beveled flange 16 on the outer surface of one of the rims or hoops 11 of the rotary screen. The supporting-frames 12 are connected with the frame by means of brackets 17, provided with clamping-loops 18, which embrace the longitudinal bars of the machine-frame. The brackets 17 are further provided with longitudinal slots 19, admitting of the adjustment of the bolts 20, which connect the clamping-loops 18 therewith, and in this way the brackets 17 may be adjusted up and down relatively to the machine-frame for correspondingly raising and lowering the supporting-frame 12 and giving the desired inclination to the rotary screen. The object in providing this adjustment is to operate with different effect upon potatoes taken from a moist or dry soil. Where the soil is moist, the potatoes should be given a more thorough agitation and rolling while passing through the rotary screen, and in order to accomplish this the screen should be adjusted more nearly to a horizontal position. Where, however, the soil is dry, considerable inclination may be given to the rotary screen for causing the potatoes to pass more rapidly therethrough.

Rotary motion is imparted to the screen 9 by means of a screen-driving belt 21, which derives its motion from a pulley on the drive-shaft 5, passing from thence around a pair of guiding-sheaves 22, journaled in bearings on a bracket 23, connected with the machine-frame, and from thence around a grooved hoop or pulley-rim 24, encircling the rotary screen.

Having thus described my invention, what I claim is—

1. In a device of the character described, the combination with machine-frame, of brackets provided with longitudinal slots, means to pass through the slots and engage the frame to adjustably mount the brackets thereon, annular supporting-frames carried by the brackets, grooved rollers journaled on the supporting-frames, a screen, hoops secured to the screen to fit in the rollers, and means for imparting rotation to the screen.

2. In a device of the character described, the combination with machine-frame, of brackets provided with longitudinal slots, clamping-loops carried by the frame, means carried by the clamping-loops to pass through the slots to adjustably mount the brackets upon the frame, annular supporting-frames carried by the brackets, grooved rollers journaled on the supporting-frames, a screen, hoops secured to the screen to fit in the rollers, and means for imparting rotation to the screen.

In testimony whereof I affix my signature in presence of two witnesses.

HORACE W. COON.

Witnesses:
E. M. BRADFORD,
BIRT FREDRICK.